(12) United States Patent
McQuiggan et al.

(10) Patent No.: US 7,785,063 B2
(45) Date of Patent: Aug. 31, 2010

(54) TIP CLEARANCE CONTROL

(75) Inventors: Gerard McQuiggan, Orlando, FL (US); Adam Foust, Orlando, FL (US)

(73) Assignee: Siemens Energy, Inc., Orlando, FL (US)

( * ) Notice: Subject to any disclaimer, the term of this patent is extended or adjusted under 35 U.S.C. 154(b) by 906 days.

(21) Appl. No.: 11/639,958

(22) Filed: Dec. 15, 2006

(65) Prior Publication Data
US 2010/0162722 A1 Jul. 1, 2010

(51) Int. Cl.
*F01D 11/24* (2006.01)
(52) U.S. Cl. .......................................... 415/1; 415/115
(58) Field of Classification Search .................. 60/782; 415/173.2
See application file for complete search history.

(56) References Cited

U.S. PATENT DOCUMENTS

| | | | |
|---|---|---|---|
| 4,257,222 A * | 3/1981 | Schwarz | 60/782 |
| 4,893,984 A * | 1/1990 | Davison et al. | 415/116 |
| 5,076,050 A * | 12/1991 | Schwarz et al. | 415/117 |
| 6,422,807 B1 * | 7/2002 | Leach et al. | 415/173.2 |
| 6,626,635 B1 * | 9/2003 | Prowse et al. | 415/173.2 |
| 6,666,645 B1 | 12/2003 | Arilla et al. | |
| 6,672,831 B2 | 1/2004 | Brandl et al. | |
| 6,717,418 B2 | 4/2004 | Orenstein | |
| 6,732,530 B2 | 5/2004 | Laurello et al. | |
| 6,772,581 B2 | 8/2004 | Ojiro et al. | |
| 6,863,495 B2 | 3/2005 | Halliwell et al. | |
| 6,896,038 B2 | 5/2005 | Arilla et al. | |
| 6,925,814 B2 | 8/2005 | Wilson et al. | |
| 6,935,836 B2 | 8/2005 | Ress, Jr. et al. | |
| 6,968,696 B2 | 11/2005 | Little | |
| 2005/0042080 A1 | 2/2005 | Gendraud et al. | |
| 2005/0076649 A1 | 4/2005 | Little et al. | |
| 2005/0109016 A1 | 5/2005 | Ullyott | |
| 2005/0109039 A1 | 5/2005 | Chehab et al. | |
| 2005/0149274 A1 | 7/2005 | Finnigan et al. | |
| 2005/0158169 A1 | 7/2005 | Amiot et al. | |
| 2008/0112797 A1 * | 5/2008 | Seitzer et al. | 415/116 |

* cited by examiner

*Primary Examiner*—Richard Edgar

(57) ABSTRACT

Aspects of the invention relate to a system and method for actively managing blade tip clearances in a turbine engine, particularly under start up and steady state operating conditions. During start up, the rotor can be cooled while the blade ring can be heated. During steady state operation, the rotor may be heated while the blade ring may be cooled. The sources of the heating fluid and cooling fluid can be compressor delivery air, boiler steam and ambient air. The fluids can be compressed to maintain efficiency.

17 Claims, 5 Drawing Sheets

TIP CLEARANCE CONTROL

FIELD OF THE INVENTION

The invention relates in general to turbine engines and, more particularly, to blade tip clearances in a turbine engine.

BACKGROUND OF THE INVENTION

Typically, gas turbine engines include a compressor for compressing air, a combustor for mixing the compressed air with fuel and igniting the mixture, and a blade assembly for producing power. Combustors often operate at high temperatures that may exceed 2,500 degrees Fahrenheit. Typical turbine combustor configurations expose blade assemblies to these high temperatures. As a result, blades must be made of materials capable of withstanding such high temperatures. Blades and other components often contain cooling systems for prolonging the life of the blades and reducing the likelihood of failure as a result of excessive temperatures.

Blades typically extend radially from a rotor assembly and terminate at a tip within close proximity of the blade rings. The blade rings may be exposed to the hot combustion gases and, similar to the blades, the blade rings often rely on internal cooling systems to reduce stress and increase the life cycle. The blade rings are spaced radially from the blade tips to create a gap therebetween to prevent contact of the blade tips with the blade rings as a result of thermal expansion of the blades. During conventional startup processes in which a turbine engine is brought from a stopped condition to a steady state operating condition, blades and blade rings pass through a pinch point at which the gap between the blade tips and the blade rings is at a minimal distance due to thermal expansion. The blade tips of many conventional configurations contact or nearly contact the blade rings. Contact of the blade tips may cause damage to the blades. Furthermore, designing the gap between the blade tips and the blade rings for the pinch point often results in a gap at steady state conditions that is larger than desired because the gap and combustion gases flowing therethrough adversely affect performance and efficiency.

FIG. 1 shows a cross-section through a portion of a turbine engine. A turbine engine 10 can generally include a compressor section 12, a combustor section 14 and a turbine section 16. A centrally disposed rotor 18 can extend through the three sections.

Generally, the combustor section 14 is enclosed within a casing 20 that can form a chamber 22, together with the aft end of the compressor casing 24 and a housing 26 that surrounds a portion of the rotor 18. A plurality of combustors 28 and ducts 30 can be provided within the chamber 22, such as in an annular array about the rotor 18. Each duct 30 can connect one of the combustors 28 to the turbine section 16.

The turbine section 16 can include an outer casing 32 that encloses alternating rows of stationary airfoils 34 (commonly referred to as vanes) and rotating airfoils 36 (commonly referred to as blades). Each row of blades can include a plurality of airfoils 36 attached to a disc 38 provided on the rotor 18. The rotor 18 can include a plurality of axially-spaced discs 38. The blades 36 can extend radially outward from the discs 38 and terminate in a region known as the blade tip 40.

Each row of vanes can be formed by attaching a plurality of airfoils 34 to the stationary support structure in the turbine section 16. For instance, the airfoils 34 can be supported by a vane carrier 42 that is attached to the outer casing 32. The vanes 34 can extend radially inward from the vane carrier 42 or other stationary support structure to which they are attached.

In operation, the compressor section 12 can compress ambient air. The compressed air 44 from the compressor section 12 can enter the chamber 22 and can then be distributed to each of the combustors 28. In the combustors 28, the compressed air can be mixed with the fuel introduced through a fuel nozzle 46. The air-fuel mixture can be burned, thereby forming a hot working gas 48. The hot gas 48 can flow through the ducts 30 and then through the rows of stationary airfoils 34 and rotating airfoils 36 in the turbine section 16, where the gas 48 can expand and generate power that can drive the rotor 18. The expanded gas 50 can then be exhausted from the turbine 16.

It should be noted that each row of blades 36 is surrounded by the stationary support structure of the turbine, which can be the outer casing 32, the vane carrier 42 or a ring seal (not shown). The space between the blade tips 40 and the neighboring stationary structure is referred to as the blade tip clearance C. During engine operation, gas leakage can occur through the blade tip clearances C, resulting in measurable engine performance decreases in power and efficiency.

The compressed air 44 from the compressor 12 can be used to cool the rotor 18 or to internally cool the turbine blades 36, among other things. A portion 52 of the compressed air 44 from the compressor 12 can be extracted from the chamber 22 and routed externally of the engine 10 through a fluid conduit connected in fluid communication with the chamber 22. The fluid conduit can be a single conduit or a plurality of conduit segments. The fluid conduit includes a first conduit segment 54 and a second conduit segment 60. By entering the first conduit segment 54, the portion of air 52 bypasses the combustors 28. The portion of air 52 is cooled by an external cooler 56 disposed along the fluid conduit. However, gas turbines undergo a range of operation for which different blade clearances are required. Cooling systems that do not account for the range of operation of the gas turbine and the change of clearances from start up through steady state operation impart inefficiencies into the system.

While small blade tip clearances C are desired to minimize gas leakage, it is critical to maintain a clearance C between the rotating turbine components (blades 36, rotor 18, and discs 38) and the stationary turbine components (vanes 34, outer casing 32, vane carriers 42 and ring seals) at all times. Rubbing of any of the rotating and stationary components can lead to substantial component damage, performance degradation, and extended outages.

However, during transient conditions such as during engine startup or part load operation, it can be difficult to ensure that adequate blade tip clearances C are maintained because the rotating parts and the stationary parts thermally expand at different rates. For instance, in a cold start situation, the rate of thermal expansion of the thermal stationary support structure is at least initially less than the rate of thermal expansion of the rotating turbine components due to the relatively larger size and thickness of the stationary support structure. As a result, the blade tip clearances C can actually decrease because the rotating components expand radially outward faster than the stationary support structure, raising concerns of blade tip rubbing.

To avoid blade tip rubbing, large tip clearances are initially provided so that minimum blade tip clearances C are maintained at known pinch points, that is, during operational conditions where the clearances C would otherwise be expected to be the smallest (hot restart, spin cool, etc.). However, because the minimum blade tip clearances C are sized for these pinch point conditions, the clearances C eventually become overly large as the rate of thermal expansion of the rotating components slows or substantially stops while the stationary support structure continues to grow radially outward. Such oversized clearances C can occur as the engine approaches or attains steady state operation, such as at base load. Consequently, engine power and efficiency can be reduced.

Thus, there is a need for a system that can improve engine performance by reducing or minimizing blade tip clearances at desired engine operating conditions.

SUMMARY OF THE INVENTION

In one aspect, a blade clearance control system for a turbine engine is provided. The turbine engine has a compressor section, a rotor assembly with a rotor, and an exhaust duct. The clearance system comprises a blade ring, a first cooling circuit and a first heating circuit. The blade ring is concentric with the rotor assembly and positioned radially outward from blade tips of the rotor assembly to define a gap therebetween. The first cooling circuit is in fluid communication with the compressor section and the rotor. The first cooling circuit has a heat exchanger in thermal communication therewith. The first heating circuit is in fluid communication with the exhaust duct and the blade ring. During engine start up, the first cooling circuit extracts compressor delivery air from the compressor section, cools the compressor delivery air via the heat exchanger and supplies the compressor delivery air to the rotor for cooling of the rotor. During engine start up, the first heating circuit extracts hot exhaust gases from the exhaust duct and supplies the hot exhaust gases to the blade ring for heating of the blade ring.

In another aspect, a blade clearance control system for a turbine engine having a rotor assembly, a shell and a boiler is provided. The clearance system comprises a blade ring, a heating circuit and a cooling circuit. The blade ring is concentric with the rotor assembly and positioned radially outward from blade tips of the rotor assembly to define a gap therebetween. The heating circuit is in fluid communication with ambient air and the blade ring, and has a compressor that provides compressed air prior to delivery to the blade ring. The cooling circuit is in fluid communication with ambient air, the compressor, the boiler and the blade ring. During engine start up, the heating circuit supplies the compressed air to the blade ring for heating of the blade ring. During steady state operation, the cooling circuit delivers the compressed air to the boiler and supplies the compressed air to the blade ring for cooling of the blade ring.

In another aspect, a method of blade clearance control in a gas turbine is provided comprising positioning a blade ring concentric with a rotor assembly and radially outward from blade tips of the rotor assembly to define a gap therebetween; during engine start up clearance is maintained by supplying cooling fluid to the rotor via a heat exchanger, supplying heating fluid to the blade ring from an exhaust duct, or supplying compressed ambient air to the blade ring; and during steady state operation clearance is maintained by supplying cooling fluid through the boiler to the blade ring, supplying heating fluid to the rotor via a heating device, or supplying compressed ambient air through a boiler to the blade ring.

The system can have a second cooling circuit in fluid communication with a boiler and the blade ring, and a second heating circuit in fluid communication with the compressor section and the rotor. The second heating circuit may have a heating device in thermal communication therewith. During steady state operation, the second cooling circuit extracts steam from the boiler and supplies the steam to the blade ring for cooling of the blade ring. During steady state operation, the second heating circuit extracts compressor delivery air from the compressor section, heats the compressor delivery air via the heating device and supplies the compressor delivery air to the rotor for heating of the rotor.

The system can have a second cooling circuit in fluid communication with the compressor section and the blade ring, with the second cooling circuit being in thermal communication with the heat exchanger. The system may have a second heating circuit in fluid communication with the compressor section and the rotor, with the second heating circuit having a heating device in thermal communication therewith. During steady state operation, the second cooling circuit can extract compressor delivery air from the compressor section, cool the compressor delivery air via the heat exchanger and supply the compressor delivery air to the blade ring for cooling of the blade ring. During steady state operation, the second heating circuit may extract compressor delivery air from the compressor section, heat the compressor delivery air via the heating device and supply the compressor delivery air to the rotor for heating of the rotor.

The second heating circuit may have a bypass valve for controlling the temperature of the compressor delivery air that is supplied to the rotor. The first heating circuit can have a compressor that compresses the hot exhaust gases prior to delivery to the blade ring. The compressor can have a compression ratio of 2:1. The heat exchanger may be a boiler. The system may have a blade clearance probe, wherein at least one of the first heating circuit, the second heating circuit, the first cooling circuit or the second cooling circuit is controlled based at least in part on data from the blade clearance probe. The system can have a bypass valve for actuating the heating circuit or the cooling circuit. The compressor may have a compression ratio of 20:1.

During engine start up, the supplying of cooling fluid to the rotor via a heat exchanger may be from compressor delivery air from the compressor section. During steady state operation, the supplying of heating fluid to the rotor via a heating device can be from compressor delivery air from the compressor section. During engine start up, the supplying of heating fluid to the blade ring from an exhaust duct may be at a temperature of about 1000° F. and/or at a compression ratio of 2:1. During engine start up, the supplying of compressed ambient air to the blade ring can be at a temperature of about 850° F. and/or at a compression ratio of 20:1. During steady state operation, the supplying of cooling fluid through the boiler to the blade ring may be at a temperature of about 500° F. During steady state operation, the supplying of compressed ambient air through a boiler to the blade ring can be at a temperature of about 500° F. During steady state operation, the supplying of compressed ambient air through a boiler to the blade ring may be at a compression ratio of 20:1.

DETAILED DESCRIPTION OF EMBODIMENTS OF THE INVENTION

Aspects of the present invention relate to a system and method for controlling blade tip clearances in a turbine engine. Embodiments of the invention will be explained in the context of several clearance control systems, but the detailed description is intended only as exemplary. Embodiments of the invention are shown in FIGS. 2-5, but aspects of the invention are not limited to the illustrated structure or application. As described in detail in the following exemplary embodiments, the rotor and/or ring segment of the gas turbine is in heat exchange relationship with the fluid being supplied thereto. The particular heat exchange components, structures, devices and/or methodologies can be chosen to facilitate the heat exchange, such as, for example, heat fins, channels and the like.

Figure 1:
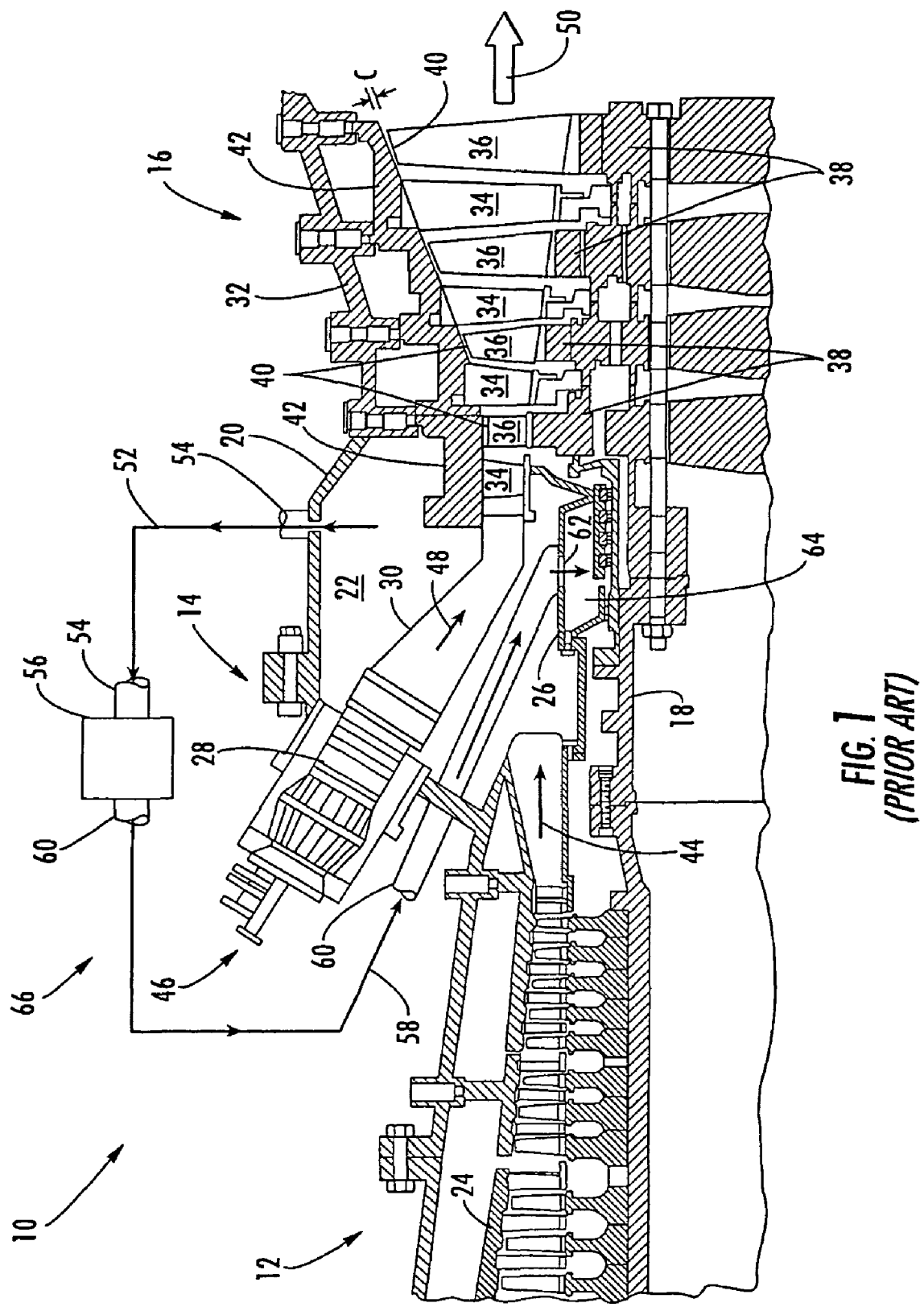
FIG. 1 is a cross-sectional view through a portion of a contemporary turbine engine.
Figure 2:
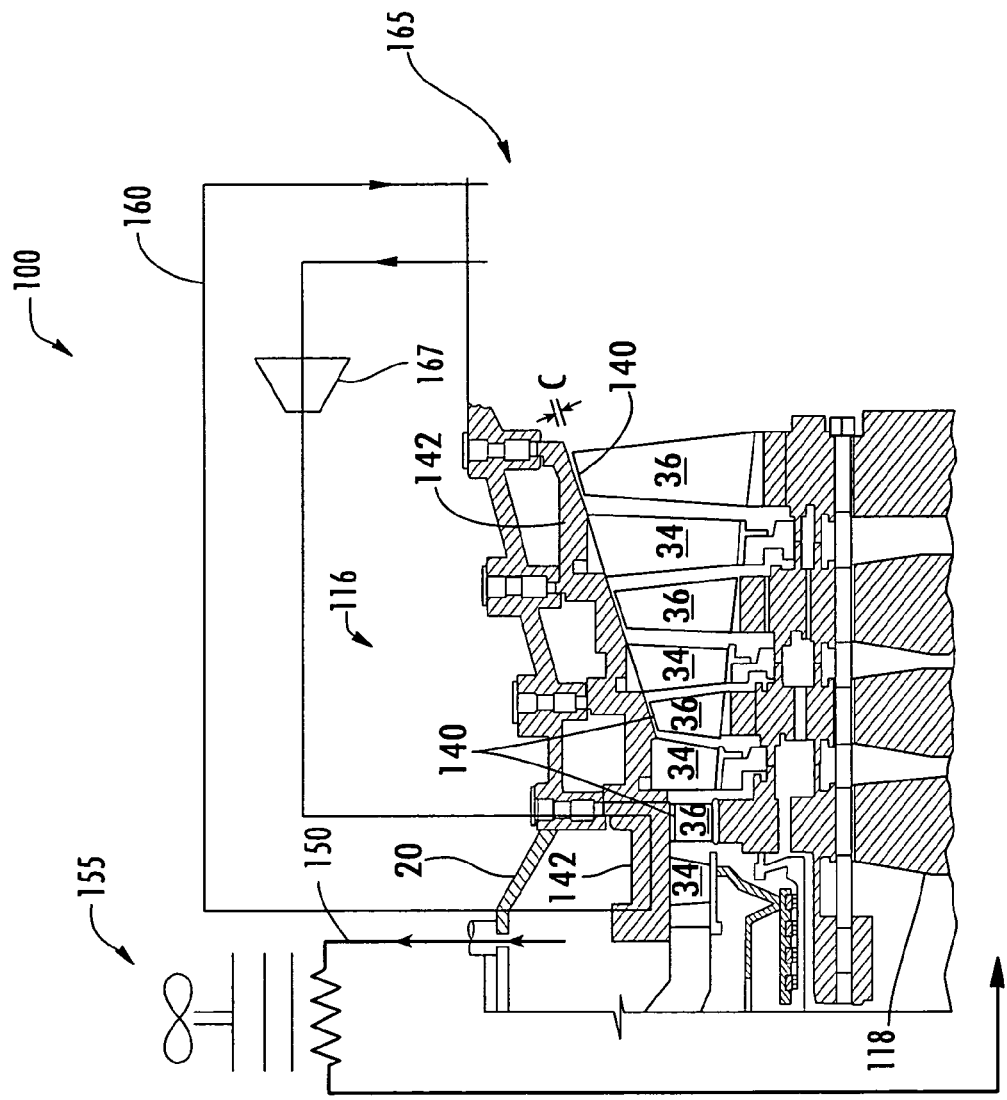
FIG. 2 is a schematic representation of a blade tip clearance control system during engine startup according to an exemplary embodiment of the invention, whereby several engine components are not shown for purposes of clarity.

Referring to FIG. 2, an exemplary embodiment of a clearance control system is shown and generally represented by reference numeral 100. The exemplary embodiment of clearance control system 100 is described with respect to row one of the turbine blades 36 of turbine section 116 of a gas turbine. However, the present disclosure contemplates use of system 100, and the other exemplary embodiments described herein, with respect to other rows of turbine blades, including any number of rows or configuration of rows, as well as the compressor section of the gas turbine. For purposes of clarity, only those portions of system 100 being utilized during engine start up are shown in FIG. 2.

During typical engine start up, system 100 can cool rotor 118 to help maintain the necessary clearance between blade tip 140 and ring segment, blade ring, or vane carrier 142. System 100 can cool air via a cooling device 155, and supply the cooled air to the rotor 118 to reduce thermal expansion of the rotor, as represented by the cooling circuit 150. Preferably, control system 100 extracts compressor delivery air and supplies it to the cooling device 155. Cooling circuit 150 preferably maintains as small a diameter of the rotor 118 as possible through thermal expansion reduction. However, the present disclosure contemplates allowing some amount of thermal expansion where efficiency or other factors makes such thermal expansion desirable.

In the exemplary embodiment, the cooling device 155 is a boiler or heat exchanger. The compressor delivery air is typically extracted at a temperature of about 750° F. and cooled to a temperature of about 350° F. to 500° F., and more preferably about 480° F. by the cooling device 155. However, the particular amount of cooling of the rotor 118, such as, for example, by cooled compressor delivery air, can be adjusted based upon the particular conditions and the clearance desired. While the exemplary embodiment describes cooling device 155 as a boiler or heat exchanger, the present disclosure contemplates the use of other cooling devices, systems and/or methodologies, as well as any number of such devices or systems, to effectively cool the compressor delivery air for cooling of the rotor 118.

Cooling circuit 150 can be any devices, systems and methodologies that provide for a cooling fluid supply, such as, for example, extraction of the compressor delivery air, cooling of that air and supply to the rotor 118. Such devices, systems and methodologies of cooling circuit 150, can include control devices, monitoring devices, valving, conduit, plenums and the like.

During typical engine start up, control system 100 can also heat ring segment 142 to help maintain the necessary clearance between blade tip 140 and the ring segment. System 100 can extract hot exhaust gases and supply the hot exhaust gases to the ring segment 142 to increase thermal expansion of the ring segment, as represented by the heating circuit 160. Preferably, the hot exhaust gases are extracted from the exhaust duct 165 by heating circuit 160.

Heating circuit preferably compresses the hot exhaust gases via a compressor 167 prior to delivery to the ring segment 142. Compressor 167 can have a 2:1 compression ratio for efficient delivery and heating of the ring segment 142. However, the present disclosure contemplates other compression ratios being utilized for compressor 167, as well as other components being incorporated into heating circuit 160 for facilitating the heating of the ring segment 142.

Heating circuit 160 increases the inner diameter of the ring segment 142 through increasing thermal expansion. The particular amount of thermal expansion can be varied for efficiency or other desirable factors.

In the exemplary embodiment, the heating circuit 160 extracts hot exhaust gases from the exhaust duct 165 at a temperature of about 1000° F. However, the particular amount of heat applied to the ring segment 142 can be adjusted based upon the particular conditions and the clearance desired. While the exemplary embodiment describes heating circuit 160 extracting hot exhaust gases for heating of the ring segment 142, the present disclosure contemplates the use of other heating devices, systems and/or methodologies to effectively heat the ring segment and control the tip clearance.

Heating circuit 160 can be any devices, systems and methodologies that provide for heating of the ring segment 142 such as, for example, via extraction of the hot exhaust gases from the exhaust duct 165 and supply to the ring segment 142. Such devices, systems and methodologies of heating circuit 160, can include control devices, monitoring devices, valving, conduit, plenums and the like. Any number of such devices, systems and methodologies of heating circuit 160 can also be used to effectively obtain the thermal expansion of the ring segment 142 which maintains the desired blade tip clearance. Once supplied to the ring segment 142, the hot exhaust gases can be returned to the exhaust duct 165.

Figure 3:
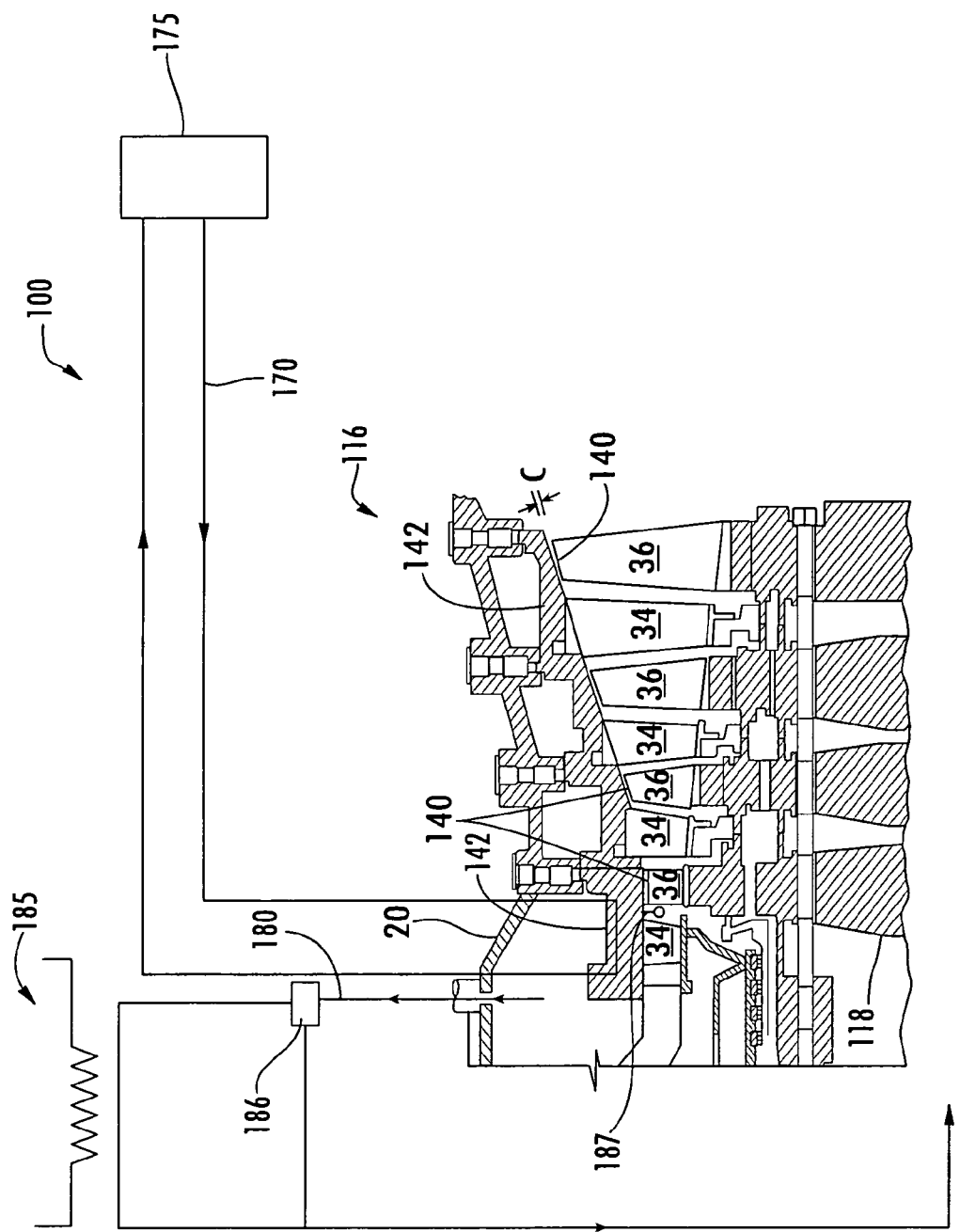
FIG. 3 is a schematic representation of the blade tip clearance control system of FIG. 2 during steady state operation, whereby several engine components are not shown for purposes of clarity.

Referring to FIG. 3, once steady state operation is achieved, system 100 can cool the ring segment 142 to help maintain the necessary clearance between blade tip 140 and the ring segment 142. System 100 can supply a cooling fluid to the ring segment 142 to reduce thermal expansion, as represented by the cooling circuit 170. Preferably, control system 100 extracts steam from the boiler 175 and supplies the steam to the ring segment 142. For purposes of clarity, only those portions of system 100 being utilized during steady state operation are shown in FIG. 3.

In the exemplary embodiment, the cooling circuit 170 extracts steam at a temperature of about 500° F. for supplying to the ring segment 142. However, the particular amount of cooling of the ring segment 142 during steady state operation, such as, for example, by steam, can be adjusted based upon the particular conditions and the clearance desired. While the exemplary embodiment describes the use of steam for cooling of the ring segment 142 during steady state operation, the present disclosure contemplates the use of other cooling devices, systems and/or methodologies, as well as any number of such devices or systems, to effectively cool the ring segment 142 and obtain the desired blade tip clearance.

Cooling circuit 170 can be any devices, systems and methodologies that provide for a cooling fluid supply, such as, for example, extraction of steam from the boiler, and supply to the ring segment 142. Such devices, systems and methodologies of cooling circuit 170, can include control devices, monitoring devices, valving, conduit, plenums and the like.

Once steady state operation is achieved, control system 100 can also control the temperature of the rotor 118 to help maintain the necessary clearance between blade tip 140 and the ring segment 142. System 100 can heat air via a heating device 185, and supply the heated air to the rotor 118 to achieve the desired thermal expansion, as represented by the heating circuit 180. Preferably, system 100 extracts compressor delivery air and supplies it to the heating device 185.

The particular amount of heating of the rotor 118, such as, for example, by heated compressor delivery air, can be adjusted based upon the particular conditions and the clearance desired. The present disclosure contemplates the use of various heating devices, systems and/or methodologies, as well as any number of such devices or systems, to effectively heat the compressor delivery air for heating of the rotor 118.

Heating circuit 180 preferably has a bypass valve 186 that provides for control of the temperature of the air being supplied to the rotor 118 by controlling the flow to heating device 185. A clearance monitoring device 187, such as, for example, a capacitance blade clearance probe, can be used for monitoring the amount of clearance between the blade tip 140 and the ring segment 142. The use of bypass valve 186 and clearance monitoring device 187 allows for active or dynamic adjustment of the clearance between the blade tip 140 and the ring segment 142 to increase the efficiency of the gas turbine through adjustment of the heating circuit 180. The present disclosure also contemplates the use of active or dynamic adjustment of the clearance between the blade tip 140 and the ring segment 142 via adjustment of the other heating and cooling circuits described with respect to the exemplary embodiments discussed herein. Such other heating and cooling circuits can use various components, including bypass valve 186 and clearance monitoring device 187, to actively and dynamically adjust the blade tip clearance.

Heating circuit 180 can be any devices, systems and methodologies that provide for a heating fluid supply, such as, for example, extraction of the compressor delivery air, heating of that air and supply to the rotor 118. Such devices, systems and methodologies of heating circuit 180, can include control devices, monitoring devices, valving, conduit, plenums and the like.

Figure 4:
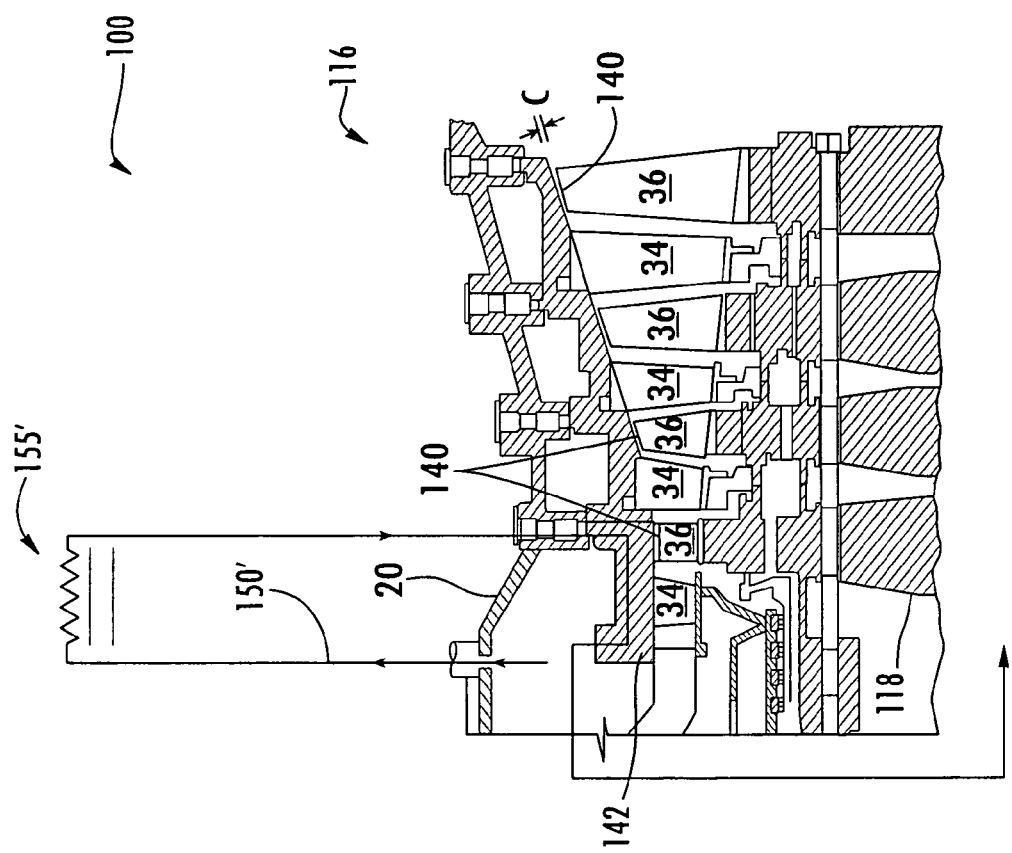
FIG. 4 is a schematic representation of another exemplary embodiment of a blade tip clearance control system during steady state operation, whereby several engine components are not shown for purposes of clarity.

Referring to FIG. 4, another exemplary cooling method and structure is shown that can be utilized by system 100 for cooling ring segment 142. Once steady state operation is achieved, system 100 can cool the ring segment 142 to help maintain the necessary clearance between blade tip 140 and the ring segment via a supply of cooled compressor delivery air. System 100 can cool air via a cooling device 155', and supply the cooled air to the ring segment 142 to maintain the desired thermal expansion of the ring segment, as represented by the cooling circuit 150'. For purposes of clarity, only those portions of system 100 that are cooling ring segment 142 according to the exemplary method and structure of cooling circuit 150' are shown in FIG. 4.

In the exemplary embodiment, the cooling device 155' is a boiler or heat exchanger. The compressor delivery air is typically extracted at a temperature of about 750° F. and cooled to a temperature of about 500° F. by the cooling device 155'. However, the particular amount of cooling of the ring segment 142 can be adjusted based upon the particular conditions and the clearance desired. While the exemplary embodiment describes cooling device 155' as a boiler or heat exchanger, the present disclosure contemplates the use of other cooling devices, systems and/or methodologies, as well as any number of such devices or systems, to effectively cool the compressor delivery air for cooling of the ring segment 142.

Cooling circuit 150' can be any devices, systems and methodologies that provide for a cooling fluid, such as, for example, extraction of the compressor delivery air, cooling of that air and supply to the ring segment 142. Such devices, systems and methodologies of cooling circuit 150', can include control devices, monitoring devices, valving, conduit, plenums and the like.

Cooling circuit 150' can use some or all of the components used by cooling circuit 150 which supplies cooled air to the rotor 118. After the ring segment 142 has been cooled, cooling circuit 150' can supply the air to the rotor 118.

Figure 5:
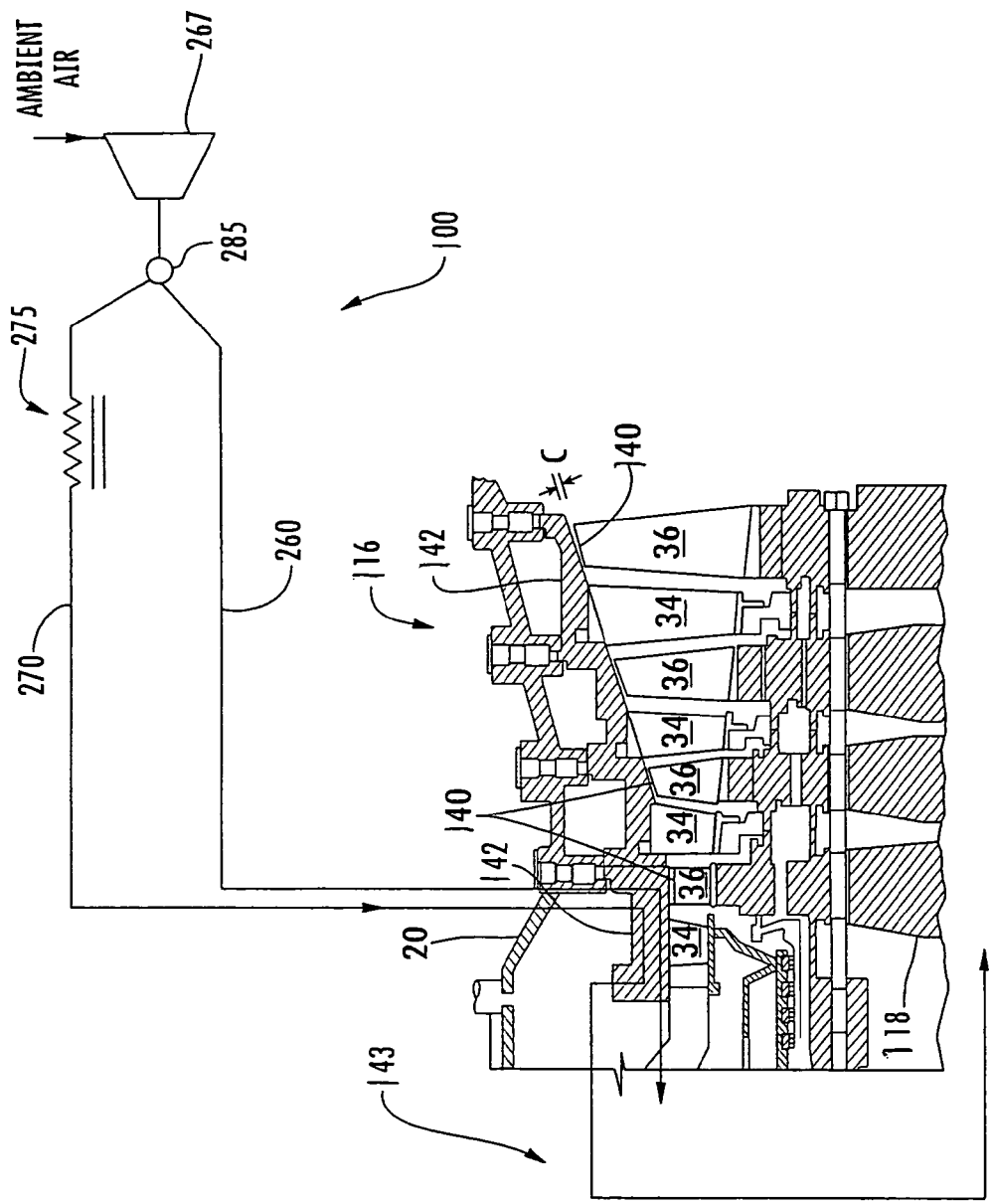
FIG. 5 is a schematic representation of another exemplary embodiment of a blade tip clearance control system during start up and steady state operation, whereby several engine components are not shown for purposes of clarity.

Referring to FIG. 5, another exemplary embodiment of clearance control system 100 is shown. The exemplary embodiment of clearance control system 100 is described with respect to row one of the turbine blades 36 of turbine section 116 of a gas turbine. However, the present disclosure contemplates use of system 100, and the other exemplary embodiments described herein, with respect to other rows of turbine blades, including any number of rows or configuration of rows, as well as the compressor section of the gas turbine.

During typical engine start up, control system 100 can heat ring segment 142 to help maintain the necessary clearance between blade tip 140 and the ring segment. System 100 can obtain air, heat the air and supply the hot air to the ring segment 142 to increase thermal expansion of the ring segment, as represented by the heating circuit 260.

Preferably, the hot air is ambient air that is compressed by heating circuit 260 via a compressor 267 prior to delivery to the ring segment 142. Compressor 267 can have a 20:1 compression ratio for efficient delivery and heating of the ring segment 142. However, the present disclosure contemplates other compression ratios being utilized for compressor 267, as well as other components being incorporated into heating circuit 260 for facilitating the heating of the ring segment 142.

Heating circuit 260 increases the inner diameter of the ring segment 142 through increasing thermal expansion. The particular amount of thermal expansion can be varied for efficiency or other desirable factors. In the exemplary embodiment, the heating circuit 260 obtains ambient air, compresses the air and delivers the air to the ring segment 142 at a temperature of about 850° F. However, the particular amount of heat applied to the ring segment 142 can be adjusted based upon the particular conditions and the clearance desired.

Heating circuit 260 can be any devices, systems and methodologies that provide for heating of the ring segment 142. Such devices, systems and methodologies of heating circuit 260, can include control devices, monitoring devices, valving, conduit, plenums and the like. Any number of such devices, systems and methodologies of heating circuit 260 can also be used to effectively obtain the thermal expansion of the ring segment 142 which maintains the desired blade tip clearance.

Once the air is used to heat the ring segment 142 to a desired temperature, the air can then be supplied to the shell 143. By supplying the heated, pressurized air to the shell 143, control system 100 can provide power augmentation to the gas turbine.

During steady state operation, control system 100 can cool ring segment 142 to help maintain the necessary clearance between blade tip 140 and the ring segment. System 100 can obtain air, cool the air and supply the cool air to the ring segment 142 to maintain the desired thermal expansion of the ring segment, as represented by the cooling circuit 270.

Preferably, the cool air is ambient air that is compressed by cooling circuit 270 via the compressor 267 prior to delivery to the ring segment 142. Compressor 267 can have a 20:1 compression ratio for efficient delivery and cooling of the ring segment 142. However, the present disclosure contemplates other compression ratios being utilized for compressor 267, as well as other components being incorporated into cooling circuit 270 for facilitating the cooling of the ring segment.

Cooling circuit 270 maintains the inner diameter of the ring segment 142 at the desired size by controlling thermal expansion. The particular amount of thermal expansion can be varied for efficiency or other desirable factors. In the exemplary embodiment, the cooling circuit 270 obtains ambient air, compresses the air, passes the air through the boiler 275 or other cooling device to cool the air and delivers the air to the ring segment 142 at a temperature of about 500° F. However, the particular amount of cooling of the ring segment 142 can be adjusted based upon the particular conditions and the clearance desired.

Cooling circuit 270 can be any devices, systems and methodologies that provide for cooling of the ring segment 142. Such devices, systems and methodologies of cooling circuit 270, can include control devices, monitoring devices, valving, conduit, plenums and the like. Any number of such devices, systems and methodologies of cooling circuit 270 can also be used to effectively obtain the thermal expansion of the ring segment 142 which maintains the desired blade tip clearance.

Heating and cooling circuits 260 and 270 preferably share a bypass valve 285 that provides for switching between start up and steady state operation. A clearance monitoring device, such as, for example, a capacitance blade clearance probe, can be used for monitoring the amount of clearance between the blade tip 140 and the ring segment 142. The use of the bypass valve 285 and the clearance monitoring device allows for active or dynamic adjustment of the clearance between the blade tip 140 and the ring segment 142 to increase the efficiency of the gas turbine through adjustment of the cooling and heating circuits 260 and 270. Cooling circuit 260 can use some or all of the same components as is used by heating circuit 270.

While especially suited for minimizing the tip clearance in the first and second rows of turbine blades in a turbine section of a turbine engine, aspects of the invention can be applied to any and all rows of blades in the turbine section, as well as in the compressor section. Further, as noted above, aspects of the invention can be particularly beneficial during start up and steady state engine operation, such as at base load. However, aspects of the invention can be used during part load operation as well or any condition in which improved engine performance is desired.

It should be understood that features of one embodiment are interchangeable with features of the other embodiments. Thus, it will of course be understood that the invention is not limited to the specific details described herein, which are given by way of example only, and that various modifications and alterations are possible within the scope of the invention as defined in the following claims.

The foregoing description is provided in the context of various systems for heating or cooling a blade ring and/or rotor to control blade tip clearances. It will of course be understood that the invention is not limited to the specific details described herein, which are given by way of example only, and that various modifications and alterations are possible within the scope of the invention as defined in the following claims.

What is claimed is:

1. A blade clearance control system for a turbine engine having a compressor section, a rotor assembly with a rotor, and an exhaust duct, the system comprising:
   a blade ring concentric with the rotor assembly and positioned radially outward from blade tips of the rotor assembly to define a gap therebetween;
   a first cooling circuit in fluid communication with the compressor section and the rotor, the first cooling circuit being in thermal communication with a heat exchanger; and
   a first heating circuit in fluid communication with the exhaust duct and the blade ring,
   wherein during engine start up the first cooling circuit extracts compressor delivery air from the compressor section, cools the compressor delivery air via the heat exchanger and supplies the compressor delivery air to the rotor for cooling of the rotor, and
   wherein during engine start up the first heating circuit extracts hot exhaust gases from the exhaust duct and supplies the hot exhaust gases to the blade ring for heating of the blade ring.

2. The system of claim 1, further comprising:
   a second cooling circuit in fluid communication with a boiler and the blade ring; and
   a second heating circuit in fluid communication with the compressor section and the rotor, the second heating circuit being in thermal communication with a heating device,
   wherein during steady state operation the second cooling circuit extracts steam from the boiler and supplies the steam to the blade ring for cooling of the blade ring, and
   wherein during steady state operation the second heating circuit extracts compressor delivery air from the compressor section, heats the compressor delivery air via the heating device and supplies the compressor delivery air to the rotor for heating of the rotor.

3. The system of claim 2, wherein the second heating circuit has a bypass valve for controlling the temperature of the compressor delivery air that is supplied to the rotor.

4. The system of claim 2, further comprising a blade clearance probe, wherein at least one of the first heating circuit, the second heating circuit, the first cooling circuit or the second cooling circuit is controlled based at least in part on data from the blade clearance probe.

5. The system of claim 1, further comprising:
   a second cooling circuit in fluid communication with the compressor section and the blade ring, the second cooling circuit being in thermal communication with the heat exchanger; and
   a second heating circuit in fluid communication with the compressor section and the rotor, the second heating circuit being in thermal communication with a heating device,
   wherein during steady state operation the second cooling circuit extracts compressor delivery air from the compressor section, cools the compressor delivery air via the heat exchanger and supplies the compressor delivery air to the blade ring for cooling of the blade ring, and
   wherein during steady state operation the second heating circuit extracts compressor delivery air from the compressor section, heats the compressor delivery air via the heating device and supplies the compressor delivery air to the rotor for heating of the rotor.

6. The system of claim 1, wherein the first heating circuit has a compressor that compresses the hot exhaust gases prior to delivery to the blade ring.

7. The system of claim 6, wherein the compressor has a compression ratio of 2:1.

8. The system of claim 1, wherein the heat exchanger is a boiler.

9. A blade clearance control system for a turbine engine having a rotor assembly, a shell and a boiler, the system comprising:
 a blade ring concentric with the rotor assembly and positioned radially outward from blade tips of the rotor assembly to define a gap therebetween;
 a heating circuit in fluid communication with ambient air and the blade ring, the heating circuit having a compressor that provides compressed air prior to delivery to the blade ring; and
 a cooling circuit in fluid communication with ambient air, the compressor, the boiler and the blade ring,
 wherein during engine start up the heating circuit supplies the compressed air to the blade ring for heating of the blade ring, and
 wherein during steady state operation the cooling circuit delivers the compressed air to the boiler and supplies the compressed air to the blade ring for cooling of the blade ring.

10. The system of claim 9, further comprising a bypass valve for actuating the heating circuit or the cooling circuit.

11. The system of claim 9, wherein the compressor has a compression ratio of 20:1.

12. The system of claim 9, further comprising a blade clearance probe, wherein at least one of the heating circuit or the cooling circuit is controlled based at least in part on data from the blade clearance probe.

13. A method of blade clearance control in a gas turbine comprising:
 positioning a blade ring concentric with a rotor assembly and radially outward from blade tips of the rotor assembly to define a gap therebetween;
 during engine start up maintaining clearance by at least one of supplying cooling fluid to the rotor via a heat exchanger, supplying heating fluid to the blade ring from an exhaust duct, or supplying compressed ambient air to the blade ring; and
 during steady state operation maintaining clearance by at least one of supplying cooling fluid from a boiler to the blade ring, supplying heating fluid to the rotor via a heating device, or supplying compressed ambient air through the boiler to the blade ring;
 wherein during engine start up the supplying of cooling fluid to the rotor via the heat exchanger is compressor delivery air from a compressor section.

14. The method of claim 13, wherein during steady state operation the supplying of heating fluid to the rotor via the heating device is compressor delivery air from a compressor section.

15. The method of claim 13, wherein during engine start up the supplying of heating fluid to the blade ring from the exhaust duct is at a temperature of about 1000° F. and at a compression ratio of 2:1.

16. The method of claim 13, wherein during steady state operation the supplying of compressed ambient air through the boiler to the blade ring is at a temperature of about 500° F.

17. The method of claim 16, wherein during steady state operation the supplying of compressed ambient air through the boiler to the blade ring is at a compression ratio of 20:1.

* * * * *